(12) United States Patent
Choi

(10) Patent No.: US 11,998,980 B2
(45) Date of Patent: Jun. 4, 2024

(54) METAL 3D PRINTER

(71) Applicant: PISTIS Co., Ltd, Incheon (KR)

(72) Inventor: Byeong Yeol Choi, Incheon (KR)

(73) Assignee: PISTIS Co., Ltd, Incheon (KR)

( * ) Notice: Subject to any disclaimer, the term of this patent is extended or adjusted under 35 U.S.C. 154(b) by 344 days.

(21) Appl. No.: 17/475,316

(22) Filed: Sep. 14, 2021

(65) Prior Publication Data
US 2022/0168815 A1 Jun. 2, 2022

(30) Foreign Application Priority Data

Nov. 30, 2020 (KR) .......................... 10-2020-0164813

(51) Int. Cl.
| | | |
|---|---|---|
| *B22F 10/10* | (2021.01) | |
| *B22F 10/18* | (2021.01) | |
| *B22F 12/00* | (2021.01) | |
| *B22F 12/10* | (2021.01) | |
| *B22F 12/17* | (2021.01) | |
| *B22F 12/37* | (2021.01) | |
| *B22F 12/53* | (2021.01) | |
| *B22F 12/55* | (2021.01) | |
| *B33Y 30/00* | (2015.01) | |
| *B33Y 40/20* | (2020.01) | |
| *B33Y 70/10* | (2020.01) | |

(52) U.S. Cl.
CPC .............. *B22F 12/17* (2021.01); *B22F 10/10* (2021.01); *B22F 10/18* (2021.01); *B22F 12/10* (2021.01); *B22F 12/226* (2021.01); *B22F 12/37* (2021.01); *B22F 12/53* (2021.01); *B22F 12/55* (2021.01); *B33Y 30/00* (2014.12); *B33Y 40/20* (2020.01); *B33Y 70/10* (2020.01); *Y02P 10/25* (2015.11)

(58) Field of Classification Search
USPC ......................................................... 134/105
See application file for complete search history.

(56) References Cited

U.S. PATENT DOCUMENTS

2017/0304946 A1* 10/2017 Shibazaki .............. B33Y 50/02

FOREIGN PATENT DOCUMENTS

KR          10-1704354 B1      2/2017

* cited by examiner

*Primary Examiner* — Levon J Shahinian
(74) *Attorney, Agent, or Firm* — Revolution IP, PLLC

(57) ABSTRACT

A metal 3D printer includes a base unit including a fixed part, a first moving part disposed on the fixed part to move in a first direction, a second moving part disposed on the first moving part to move in a second direction, and a third moving part disposed on the second moving part to move in a third direction, a nozzle unit coupled to the second moving part to move in the first and second directions and move in the third direction and injecting a material for manufacturing a sculpture, a processing unit coupled to the third moving part to move in the first to third directions and processing the sculpture, a table unit disposed rotatably to the fixed part and disposed below the nozzle unit, and a heating unit disposed on the fixed part.

5 Claims, 5 Drawing Sheets

METAL 3D PRINTER

CROSS-REFERENCE TO RELATED APPLICATIONS

This U.S. non-provisional patent application claims priority under 35 U.S.C. § 119 of Korean Patent Application No. 10-2020-0164813, filed on Nov. 30, 2020, the entire contents of which are hereby incorporated by reference.

BACKGROUND

The present invention herein relates to a metal 3D printer, and more particularly, to a metal 3D printer including a nozzle unit and a table unit, which are movable and rotatable in multiple axes.

A 3D printer is a device for manufacturing a three-dimensional product based on drawing data. The 3D printer at the beginning of development is generally used to manufacture a sample or a modeling by using a curable material such as plastic. However, in recent years, the 3D printer may also use a metal material.

The 3D printer using the metal material may be largely classified into a powder bed fusion (PB) type 3D printer of stacking by irradiating a powder-type metal material with a beam to sinter or melt only a wanted portion, a binder jetting (BJ) type 3D printer of coupling materials by injecting a liquid-type adhesive on a powder-type material, and a directed energy deposition (DED) type 3D printer of applying a molten material through a nozzle.

Here, the typical DED type metal 3D printer requires an additional post-process for compensating a limitation in which molten metal loses heat and is quickly solidified instantly when injected from the nozzle to cause degradation in work accuracy and work efficiency because the sculpture completed in the 3D printer is necessarily transferred to a separate cutting device.

Thus, the metal 3D printer that improves the work accuracy and the work efficiency by including a processing unit and a nozzle unit together is required.

RELATED ART DOCUMENT

Patent Document (Patent document 1) Korean Patent Registration No. 10-1704354

SUMMARY

The present invention provides a metal 3D printer improving a work accuracy and a work efficiency by including a processing unit and a nozzle unit together.

Technical objects to be solved by the present invention are not limited to the aforementioned technical objects and unmentioned technical objects will be clearly understood by those skilled in the art from the specification and the appended claims.

An embodiment of the present invention provides a metal 3D printer including: a base unit including a fixed part, a first moving part disposed on the fixed part to move in a first direction, a second moving part disposed on the first moving part to move in a second direction, and a third moving part disposed on the second moving part to move in a third direction; a nozzle unit coupled to the second moving part to move in the first and second directions and move in the third direction and injecting a material for manufacturing a sculpture; a processing unit coupled to the third moving part to move in the first to third directions and processing the sculpture; a table unit disposed rotatably to the fixed part and disposed below the nozzle unit to allow the material injected from the nozzle unit to be seated thereon; and a heating unit disposed on the fixed part to move in the third direction and disposed below the table unit to heat the table unit.

In an embodiment of the present invention, the nozzle unit may include: a first nozzle part injecting a metal material; a second nozzle part injecting a support material for supporting the metal material; a first nozzle driving part coupled to the second moving part to allow the first nozzle part to move in the third direction; and a second nozzle driving part coupled to the second moving part to allow the second nozzle part to move in the third direction.

In an embodiment of the present invention, the processing unit may include: a cutting part in which a rotating cutting tool for cutting the sculpture is detachably provided; and a liquid injection part coupled to a lower portion of the cutting part to inject liquid toward the sculpture.

In an embodiment of the present invention, the table unit may include: a table part on which the material injected from the nozzle unit is seated; a support part supporting the table part so that the table part rotates around the second direction; a first table driving part coupled to the support part and allowing the table part to rotate around the second direction; and a second table driving part coupled to the fixed part and allowing the support part to rotate around the first direction.

In an embodiment of the present invention, the table part may include a base member coupled rotatably to the support part and having a hollow that passes through a central portion thereof and a connector member which is coupled with the base member to cover a portion of the hollow and on which the material is seated.

In an embodiment of the present invention, the heating unit may include: a heating part that is insertable to the hollow and heating the material seated on the connector member through the hollow; a first heating driving part coupled with the heating part to allow the heating part to move in the third direction; and a second heating driving part coupled with the first heating driving part to allow the first heating driving part to rotate around the third direction.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
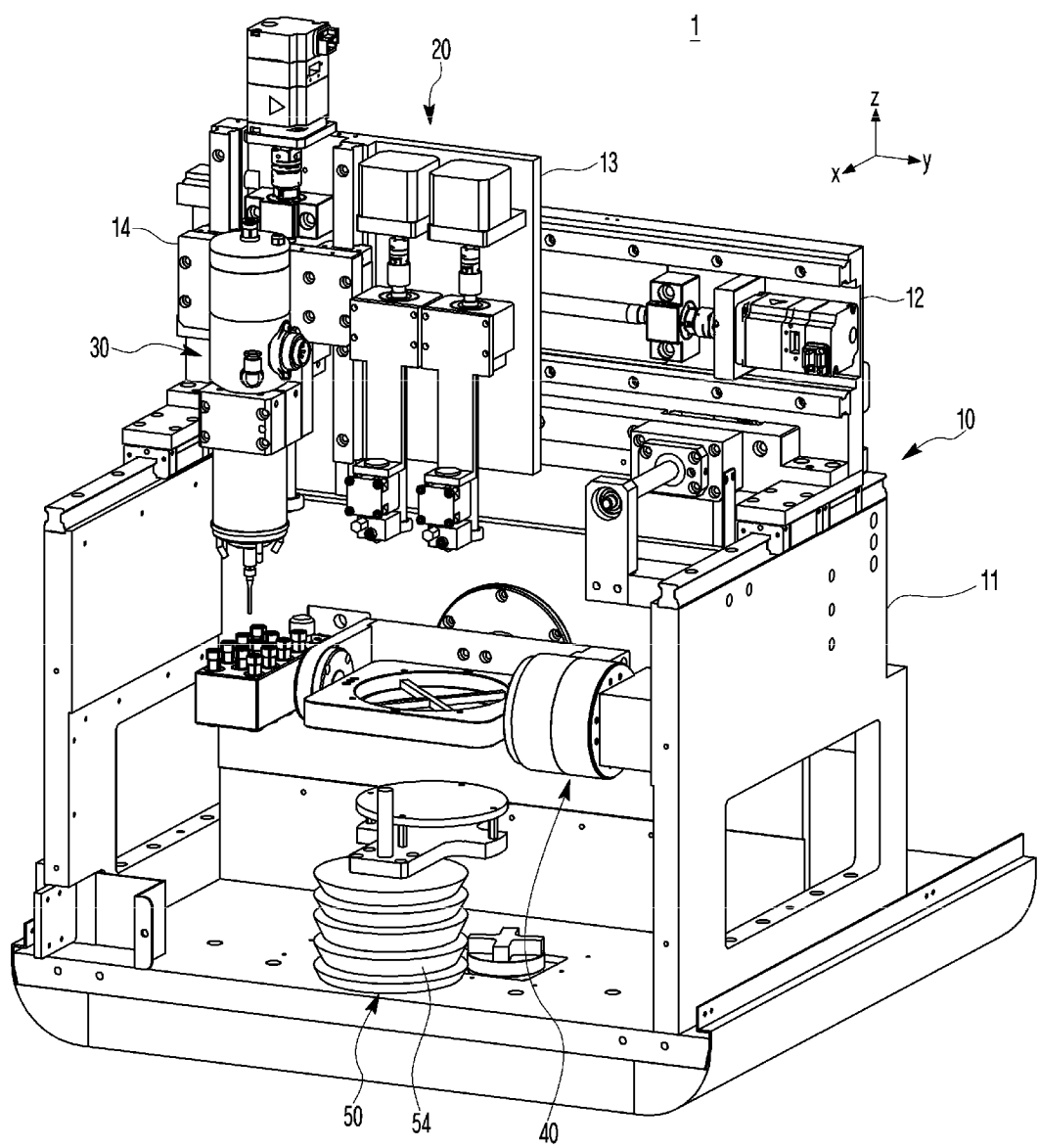
FIG. 1 is a perspective view illustrating a metal 3D printer according to an embodiment of the present invention.

Hereinafter, the present invention will be described with reference to the accompanying drawings. The present disclosure may, however, be embodied in different forms and should not be construed as limited to the embodiments set forth herein. In the following description of the present invention, a detailed description of known functions and configurations incorporated herein will be omitted to avoid making the subject matter of the present invention unclear and, in every possible case, like reference numerals are used for referring to the same or similar elements in the description and drawings.

In this disclosure below, when one part is referred to as being "connected" to another part, it should be understood that the former can be "directly connected" to the latter, or "indirectly connected" to the latter via an intervening member. Furthermore, when it is described that one "comprises (or includes or has)" some elements, it should be understood that it may comprise (or include or has) only those elements, or it may comprise (or include or have) other elements as well as those elements if there is no specific limitation.

In the following description, the technical terms are used only for explaining a specific exemplary embodiment while not limiting the present invention. The terms of a singular form may include plural forms unless referred to the contrary. The meaning of 'include' or 'comprise' specifies a property, a fixed number, a step, an operation, an element, a component, or a combination thereof but does not exclude other properties, fixed numbers, steps, operations, elements, components, combinations thereof. Also, terms "part", "module", and "unit" used in this specification may represent a unit for processing one function or operation, and they may be realized by hardware, software, or a combination thereof.

Hereinafter, specific embodiments will be described in detail with reference to the accompanying drawings.

FIG. 1 is a perspective view illustrating a metal 3D printer 1 according to an embodiment of the present invention.

The metal 3D printer 1 may include a base unit 10, a nozzle unit 20, a processing unit 30, a table unit 40, and a heating unit 50.

The base unit 10, as a component forms a frame of the metal 3D printer 1, may be a structure for supporting the nozzle unit 20, the processing unit 30, the table unit 40, and the heating unit 50.

The base unit 10 may include: a fixed part 11 supported on an installation surface; a first moving part 12 disposed on the fixed part 11 to move in a first direction (a X-axis direction); a second moving part 13 disposed on the first moving part 12 to move in a second direction (a Y-axis direction); and a third moving part 14 disposed on the second moving part 13 to move in a third direction (a Z-axis direction).

The nozzle unit 20, as a component for injecting and laminating a material to manufacture a sculpture, may be coupled to the second moving part 13 of the base unit 10 and move in the first and second directions by the base unit 10. Also, the nozzle unit 20 may move in the third direction.

The processing unit 30, as a component for processing the sculpture manufactured by the nozzle unit 20, may be coupled to the third moving part 14 of the base unit 10 and move in the first to third directions by the base unit 10.

The table unit 40, as a component for allowing a material injected from the nozzle unit 20 to be seated and supported thereon, may be coupled to the fixed part 11 of the base unit 10 so as to be disposed below the nozzle unit 20. Also, the table unit 40 may rotate around the first direction and the second direction.

The heating unit 50, as a component for heating the table unit 40, may be coupled to the fixed part 11 of the base unit 10 so as to be disposed below the table unit 40. Also, the heating unit 50 may move in the third direction and rotate around the third direction.

The present invention may manufacture and process the sculpture without stopping and manufacture the sculpture with an improved accuracy by including the nozzle unit 20 and the processing unit 30 together.

Also, since the nozzle unit 20 and the processing unit 30 move together by the base unit 10 in the first and second directions according to the present invention, a mutual collision thereof may be prevented during a moving process.

Figure 2:
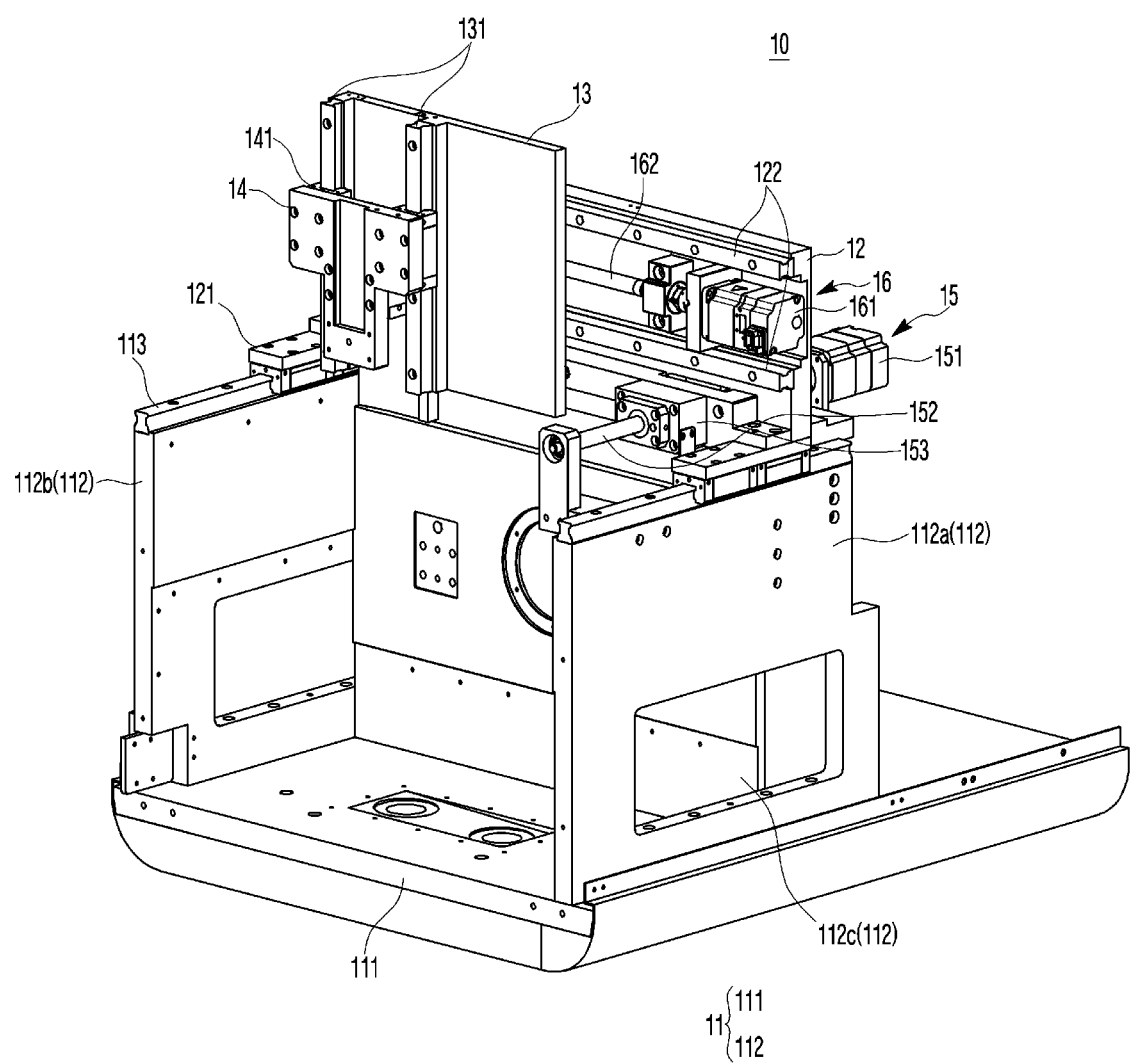
FIG. 2 is a perspective view illustrating a base unit according to an embodiment of the present invention.

FIG. 2 is a perspective view illustrating the base unit 10 according to an embodiment of the present invention.

The fixed part 11 may include a bottom body 111 supported on the installation surface and three sidewalls 112a to 112c coupled perpendicularly to the bottom body 111.

One pair of sidewalls 112a and 112b may face each other and each have a hollow therein. Also, the rest one sidewall 112c may be disposed perpendicularly to the one pair of sidewalls 112a and 112b and coupled with the one pair of sidewalls 112a and 112b disposed at both sides thereof.

A first guide rail 113 for guiding a first directional movement of the first moving part 12 may be formed on a top surface of each of the one pair of sidewalls 112a and 112b. Here, the first guide rail 113 may have a shape extending in the first direction.

The first moving part 12 may be disposed above the fixed part 11 in perpendicular to the one pair of sidewalls 112a and 112b, and a first moving block 121 that is movable along each of the first guide rails 113 may be coupled to a lower portion of the first moving part 12.

Also, one pair of second guide rails 122 for guiding a second directional movement of the second moving part 13 may be formed on one surface of the first moving part 12. Here, the second guide rails 122 may each have a shape extending in the second direction and be spaced apart from each other.

The second moving part 13 may be disposed in parallel to the first moving part 12, and a second moving block (not shown) that is movable along each of the second guide rails 122 may be coupled to the second moving part 13. Here, the second moving block (not shown) may be coupled to one surface of the second moving part 13, and the nozzle unit 20 may be coupled to the other surface of the second moving part 13.

Also, one pair of second guide rails 131 for guiding a third directional movement of the third moving part 14 may be formed on the other surface of the second moving part 13. Here, the third guide rails 131 may each have a shape extending in the third direction and be spaced apart from each other.

The third moving part 14 may be disposed in parallel to the second moving part 13, and a third moving block 141 that is movable along each of the third guide rails 131 may be coupled to the third moving part 14. Here, the third moving block 14 may be coupled to one surface of the third moving part 14, and the processing unit 30 may be coupled to the other surface of the third moving part 14.

That is, the processing unit 30 may be coupled to the third moving part 14 and guided to move in the first to third directions by the base unit 10, and the nozzle unit 20 may be coupled to the second moving part 13 and guided to move in the first and second directions by the base unit 10.

According to the present invention, a vibration caused by a driving of the processing unit 30 may be attenuated by the second moving part 13 and the third moving part 14 and may not be transmitted to the nozzle unit 20.

Also, the base unit 10 may further include: a first base driving part 15 coupled to the fixed part 11 and allowing the first moving part 12 to move in the first direction; a second base driving part 16 coupled to the first moving part 12 and allowing the second moving part 13 to move in the second direction; and a third base driving part 17 coupled to the second moving part 13 and allowing the third moving part 14 to move in the third direction.

The first base driving part 15 may include a motor 151 coupled to the sidewall 112c of the fixed part 11, a rotation shaft 152 rotating in forward and reverse directions according to an operation of the motor 151, and a moving body 153 moving forward and backward in the first direction according to the rotation of the rotation shaft 152.

Here, the motor 151 may be disposed at a position facing the other surface of the first moving part 12. The rotation shaft 152 may pass through the first moving part 12 and be disposed in parallel to the first guide rail 113, and the moving body 152 may be coupled to the one surface of the first moving part 12.

The second base driving part 16 may include a motor 161 coupled to one surface of the first moving part 12, a rotation shaft 162 rotating in the forward and reverse directions according to an operation of the motor 161, and a moving body (not shown) moving forward and backward in the second direction according to the rotation of the rotation shaft 162. Here, the rotation shaft 162 may be disposed in parallel to the second guide rails 122 between the one pair of second guide rails 122, and the moving body (not shown) may be coupled with the second moving part 13.

Figure 3:
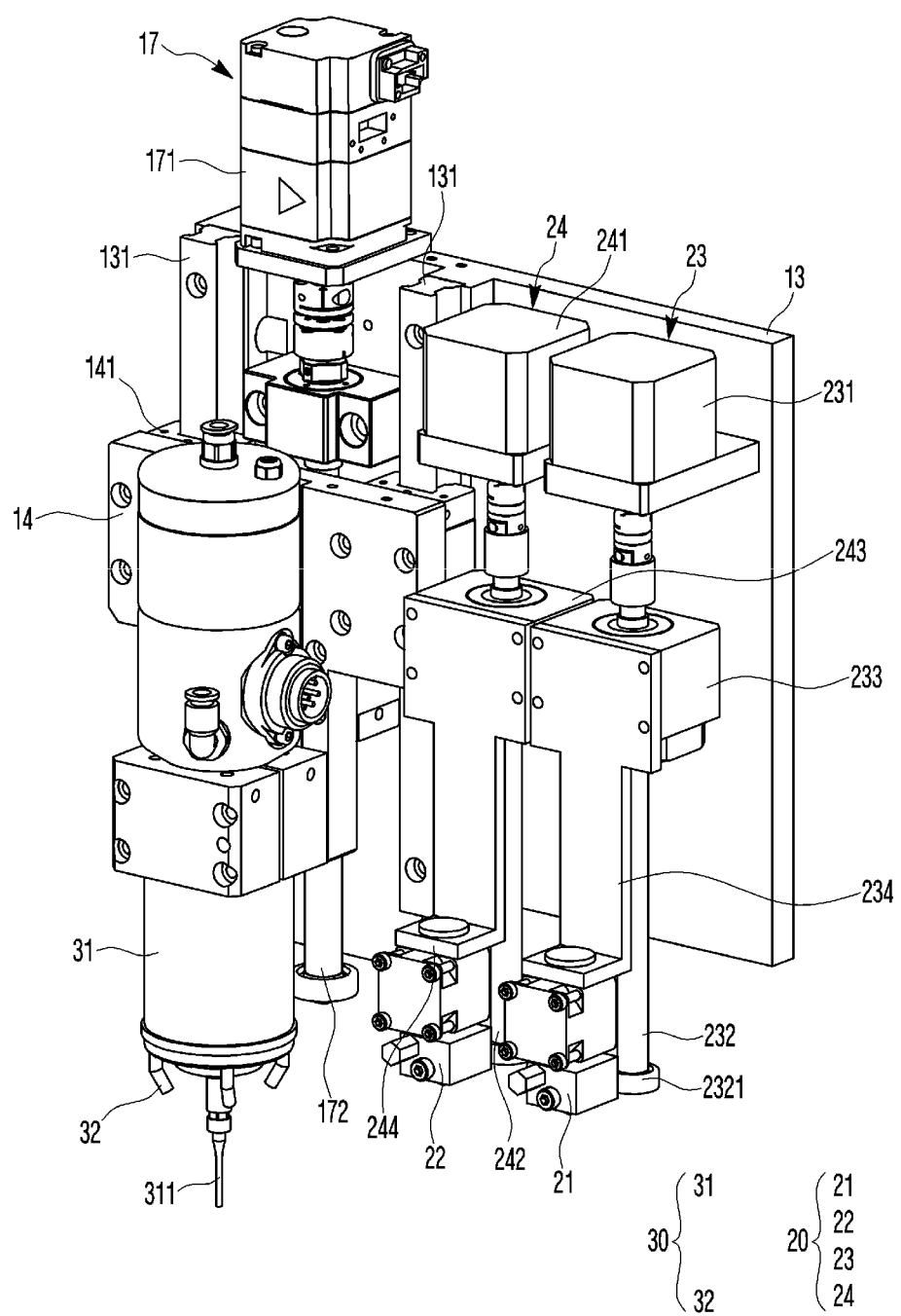
FIG. 3 is a perspective view a nozzle unit coupled to a second moving part and a processing unit coupled to a third moving part according to an embodiment of the present invention.

Referring to FIG. 3, the third base driving part 17 may include a motor 171 coupled to the outer surface of the second moving part 13, a rotation shaft 171 rotating in the forward and reverse directions according to an operation of the motor 171, and a moving body (not shown) moving forward and backward in the third direction according to the rotation of the rotation shaft 172.

Here, the rotation shaft 172 may be disposed in parallel to the third guide rails 131 between the one pair of third guide rails 131, and the moving body (not shown) may be coupled with the third moving part 14.

That is, according to the present invention, a first directional position and a second directional position of each of the nozzle unit 20 and the processing unit 30 may be adjusted through the first base driving part 15 and the second base driving part 16, and a third directional position of the processing unit 30 may be adjusted through the third base driving part 16.

FIG. 3 is a perspective view illustrating the nozzle unit 20 coupled to the second moving part 13 and the processing unit 30 coupled to the third moving part 14 according to an embodiment of the present invention.

The nozzle unit 20 may include a first nozzle part 21 injecting a metal material and a second nozzle part 22 injecting a support material for supporting the metal material.

Each of the first nozzle part 21 and the second nozzle part 22 may melt a filament-type material in a FDM method and inject the melted material to the outside. Here, the metal material may be a metal material mixed with a resin component such as poly lactic acid (PLA), and the support material may be a water soluble resin such as carboxy methyl cellulose (CMC).

The present invention may form a preliminary sculpture by firstly injecting the support material through the second nozzle part 22 and manufacture a final sculpture by injecting the metal material on the preliminary sculpture through the first nozzle part 21. Here, when the final sculpture contacts water, the support material may be removed, and an engraved pattern may be formed in a surface as the support material is removed.

The nozzle unit 20 may further include a first nozzle driving part 23 allowing the first nozzle part 21 to move in the third direction and a second nozzle driving part 24 allowing the second nozzle part 22 to move in the third direction. Here, the first nozzle driving part 23 and the second nozzle driving part 24 may be coupled to the other surface of the second moving part 13.

The first nozzle driving part 23 may include a motor 231 coupled to the other surface of the second moving part 13, a rotation shaft 232 rotating in the forward and reverse directions according to an operation of the motor 231, a moving body 233 moving forward and backward in the third direction according to the rotation of the rotation shaft 232, and a connection body 234 for connecting the moving body 233 and the first nozzle part 21.

The rotation shaft 232 may have an upper end coupled with the motor 231 and a lower end protruding further than a lower end of the second moving part 13. Also, a separation preventing body 2321 for preventing separation of the moving body 233 may be coupled to the lower end of the rotation shaft 232.

The connection body 234 may have a flat plate shape having a perpendicularly bent lower end, and have an upper end coupled with the moving body 233 and a lower end coupled with the first nozzle part 21.

Since the second nozzle driving part 24 have the same configuration as the first nozzle driving part 23, a detailed description thereof will be omitted.

That is, the present invention may adjust each of third directional positions of the first nozzle part 21 and the second nozzle part 22 through one pair of nozzle driving parts 23 and 24.

The processing unit 30 may further include a cutting part 31 in which a rotating cutting tool 311 is detachable provided at a lower portion thereof and a plurality of liquid injection parts 32 provided at the lower portion of the cutting part 31 to inject liquid toward the sculpture. Here, the liquid may be water.

The cutting part 31 may include a spindle (not shown) coupled with the rotating cutting tool 311 to rotate the rotating cutting tool 311 therein and have an inner space (not shown) spaced apart from the spindle and communicating with the liquid injection parts 32. Here, the liquid may be stored in the inner space.

The liquid injection parts 32 may each have a tube shape having a lower end bent at a predetermined angle and be radially arranged with respect to the rotating cutting tool 311. Here, the lower end of each of the liquid injection parts 32 may head toward the rotating cutting tool 311.

Through this, the present invention may cut the final sculpture manufactured by the nozzle unit 20 by using the cutting part 31 and remove the support material in the final sculpture by using the liquid injection part 32.

Figure 4:
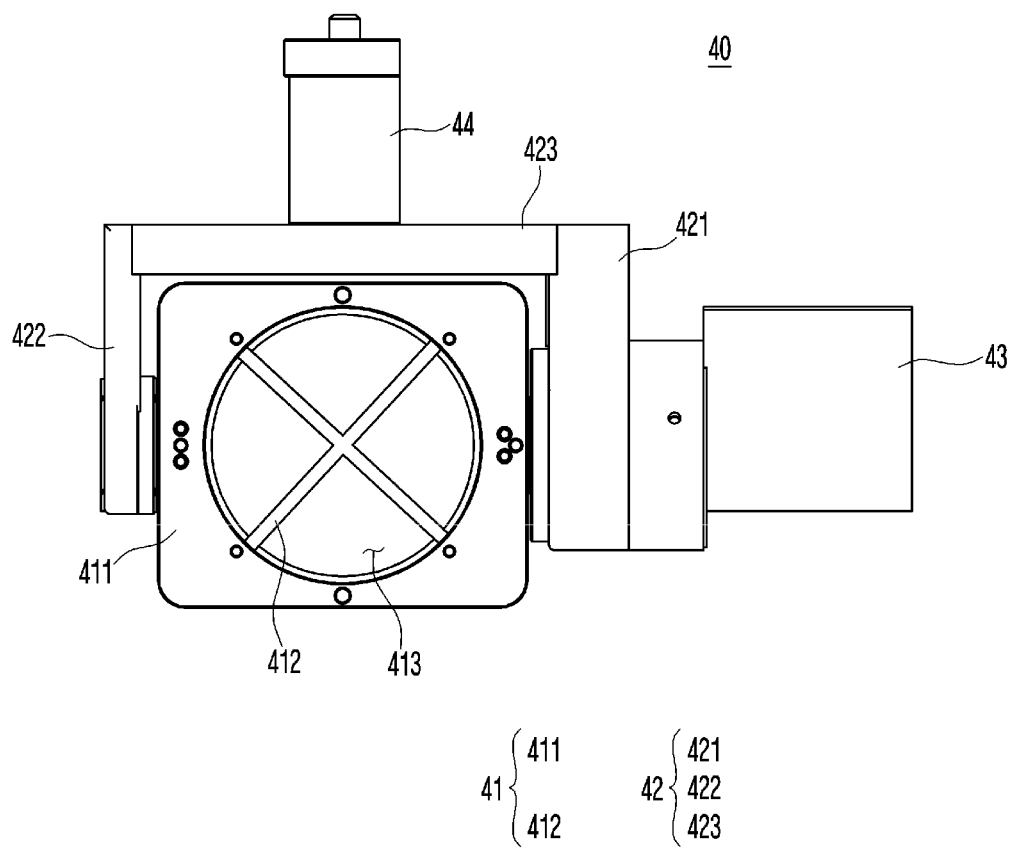
FIG. 4 is a plan view illustrating a table unit according to an embodiment of the present invention.

FIG. 4 is a plan view illustrating the table unit 40 according to an embodiment of the present invention.

The table unit 40 may include: a table part 41 on which the injected material is seated; a support part 42 supporting the table part 41 to be rotatable around the second direction; a first table driving part 43 coupled with the support part 42 and allowing the table part 41 to rotate around the second direction; and a second table driving part 44 coupled with the sidewall 112c and allowing the support part 42 to rotate around the first direction.

The table part 41 may include a base member 411 rotatably coupled to the support part 42 and having a hollow 413 at a central portion thereof and a connector member 412 coupled with the base member 411 and on which the material is seated.

Here, the base member 411 may be rotatably coupled to the support part 42 through one pair of shafts (not shown) that are symmetrically to each other and coupled to an outer circumference thereof, and one of the one pair of shafts may be coupled with a rotation shaft 432 of the first table driving part 43.

The connector member 412 may be detachably coupled with the base member 411 so as to be disposed in the hollow 413. Here, the connector member 412 may cover a portion of the hollow 413, specifically, have a +, −, or V-shape. The connector member 412 may be press fit joined with the base member 411 by inserting an end of the connector member 412 to a groove (not shown) defined in an inner circumference of the base member 411.

Through this, in the present invention, heat of the heating unit 50 may be transferred to the material seated on the connector member 412 through the hollow 413 of the base member 411.

The support part 42 may have a shape in which both ends 421 and 422 are bent perpendicularly to head the same direction, and the table part 41 may be disposed between both the ends 421 and 422. Also, a central portion 423 of the support part 42 may be coupled with the rotation shaft of the second table driving part 44.

The first table driving part 43 may include a motor coupled to one end 421 of the support part 42 and having a rotation shaft. The rotation shaft of the first table driving part 43 may pass through the one end of the support part 42 and be coupled with a shaft of the base member 411.

The second table driving part 44 may include a motor coupled to the sidewall 112c and having a rotation shaft. The rotation shaft of the second table driving part 44 may be coupled with the central portion 423 of the support part 42.

That is, the present invention may adjust a rotation angle of the table part 41 through the first table driving part 43 and the second table driving part 44.

Figure 5:
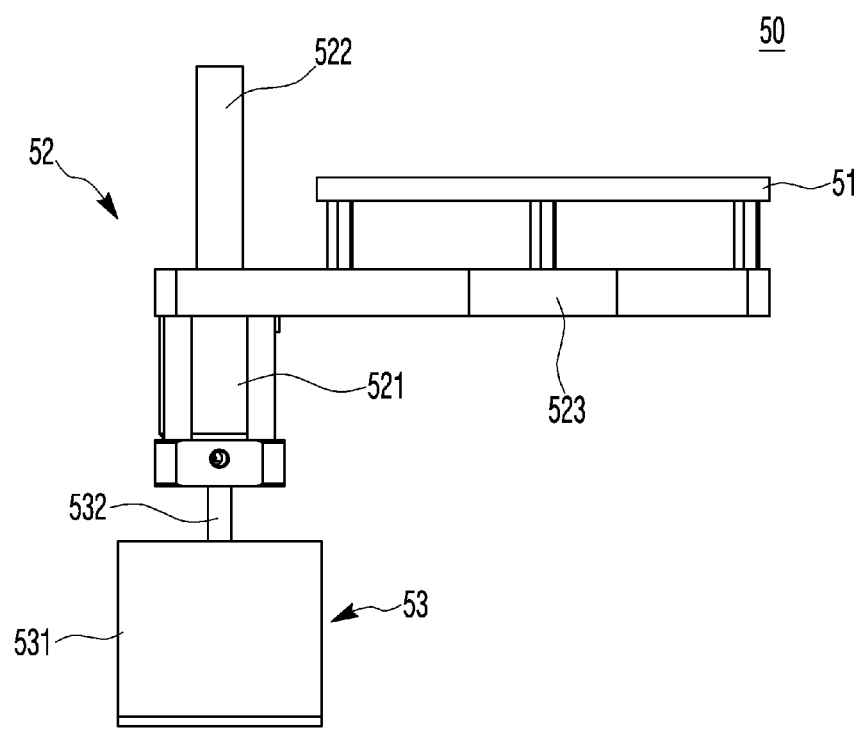
FIG. 5 is a right side view illustrating a heating unit according to an embodiment of the present invention.

FIG. 5 is a right side view illustrating the heating unit 50 according to an embodiment of the present invention. Here, a cover part 54 is not illustrated in FIG. 5 for convenience of description.

The heating unit 50 may include: a heating part 51 with a heating film attached or embedded; a first heating driving part 52 allowing the heating part 51 to move in the third direction; and a second heating driving part 53 allowing the first heating driving part 52 to rotate around the third direction. Here, the heating part 51 may have a circular plate shape having a diameter less than that of the hollow 413 of the base member 4111.

The first heating driving part 52 may include a motor 521 coupled to the second heating driving part, a rotation shaft 522 rotating in the forward and reverse directions according to an operation of the motor 521, and a moving body 523 moving forward and backward in the third direction according to the rotation of the rotation shaft 522. Here, the moving body 523 may be coupled with the heating part 51.

The second heating driving part 53 may include a motor 531 coupled to the bottom body 111 and a rotation shaft 532 rotating in the forward and reverse directions according to an operation of the motor 531, and the first heating driving part 52 may be coupled to an upper portion of the rotation shaft 532. That is, the first heating driving part 52 allowing the heating part 51 to elevate may rotate together as the second heating driving part 53 is driven.

Through this, the present invention may allow the heating part 51 to be disposed adjacent to the table part 41 in a material injecting process of the nozzle unit 20 and prevent the material injected from the nozzle unit 20 from being rapidly cooled. Also, when the material injecting process of the nozzle unit 20 is completed, the heating part 51 may be spaced apart from the table part 41 so that a rotation driving of the table unit 40 is not disturbed in a sculpture processing process of the processing unit 30.

Referring to FIG. 1, the heating unit 50 may further include a case 54 for protecting the first heating driving part 52 and the second heating driving part 53 to prevent malfunction of each of the first heating driving part 52 and the second heating driving part 53 by the liquid injected from the liquid injection part 32.

The case 54 may have a bellows shape for accommodating the motor 521 of the first heating driving part 52 and the second heating driving part 53. The case 54 may be contracted and expanded according to elevation of the moving body 523 of the first heating driving part 52.

Although not illustrated in the drawing of the present invention, the metal 3D printer 1 may include an openable case for accommodating the base unit 10, the nozzle unit 20, the processing unit 30, the table unit 40, and the heating unit 50 and a control unit for controlling an overall operation of the metal 3D printer 1.

The control unit may allow the table part 41 to be disposed adjacent to the heating part 51 when a drawing is inputted, allow the first nozzle part 21 to inject the support material while moving to manufacture the preliminary sculpture based on the drawing, and then allow the second nozzle part 22 to inject the metal material while moving to manufacture the final sculpture.

Thereafter, the control unit may allow the heating part 51 to be spaced apart from the table part 41 and remove the support material portion of the final sculpture by injecting the liquid to the final sculpture through the liquid injection part 32 before a cutting process is performed on the final sculpture by using the cutting part 31 (or after the cutting process is performed on the final sculpture).

Also, when the final sculpture is completely manufactured, a purging process may be performed by supplying a polymer resin having compatibility with the metal material to the first nozzle part 21 to remove metal remained in the first nozzle part 21. Here, the polymer resin may be poly lactic acid (PLA).

The metal 3D printer 1 according to the present invention may be used to manufacture artificial teeth.

According to an embodiment of the present invention, the present invention may improve the work accuracy and the work efficiency because the nozzle unit and the processing unit are provided together to perform the manufacturing and processing of the sculpture without stopping.

Also, since the present invention has the structure in which the nozzle unit and the processing unit move together in the first and second directions by the base unit, the mutual collision thereof may not occur.

Also, the present invention may remove the support material in the final sculpture through the processing unit including the liquid injection part.

It will be understood that the effects of the prevent invention are not limited to the above-described effects and include all effects that are deducible from the inventions disclosed in the detailed description or claims of the present invention.

The description of the present invention is intended to be illustrative, and those with ordinary skill in the technical field of the present invention pertains will be understood that the present invention can be carried out in other specific forms without changing the technical idea or essential features. Thus, the above-disclosed embodiments are to be considered illustrative and not restrictive. For example, each of the components described as a single part may be divided for use as a plurality of parts. Conversely, the components described as a plurality of parts may be combined for use as a single part.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

What is claimed is:

1. A metal 3D printer comprising:
a base unit comprising a fixed part, a first moving part disposed on the fixed part to move in a first direction, a second moving part disposed on the first moving part to move in a second direction, and a third moving part disposed on the second moving part to move in a third direction;
a nozzle unit coupled to the second moving part to move in the first and second directions and move in the third direction and configured to inject a material for manufacturing a sculpture;
a processing unit coupled to the third moving part to move in the first to third directions and configured to process the sculpture;
a table unit disposed rotatably to the fixed part and disposed below the nozzle unit to allow the material injected from the nozzle unit to be seated thereon; and
a heating unit disposed on the fixed part to move in the third direction and disposed below the table unit to heat the table unit,
wherein the processing unit comprises:
a cutting part in which a rotating cutting tool configured to cut the sculpture is detachably provided; and
a liquid injection part coupled to a lower portion of the cutting part to inject liquid toward the sculpture.

2. The metal 3D printer of claim 1, wherein the nozzle unit comprises:
a first nozzle part configured to inject a metal material;
a second nozzle part configured to inject a support material for supporting the metal material;
a first nozzle driving part coupled to the second moving part to allow the first nozzle part to move in the third direction; and
a second nozzle driving part coupled to the second moving part to allow the second nozzle part to move in the third direction.

3. A metal 3D printer comprising:
a base unit comprising a fixed part, a first moving part disposed on the fixed part to move in a first direction, a second moving part disposed on the first moving part to move in a second direction, and a third moving part disposed on the second moving part to move in a third direction;
a nozzle unit coupled to the second moving part to move in the first and second directions and move in the third direction and configured to inject a material for manufacturing a sculpture;
a processing unit coupled to the third moving part to move in the first to third directions and configured to process the sculpture;
a table unit disposed rotatably to the fixed part and disposed below the nozzle unit to allow the material injected from the nozzle unit to be seated thereon; and
a heating unit disposed on the fixed part to move in the third direction and disposed below the table unit to heat the table unit,
wherein the table unit comprises:
a table part on which the material injected from the nozzle unit is seated;
a support part configured to support the table part so that the table part rotates around the second direction;
a first table driving part coupled to the support part and configured to allow the table part to rotate around the second direction; and
a second table driving part coupled to the fixed part and configured to allow the support part to rotate around the first direction.

4. The metal 3D printer of claim 3, wherein the table part comprises a base member coupled rotatably to the support part and having a hollow that passes through a central portion thereof and a connector member which is coupled with the base member to cover a portion of the hollow and on which the material is seated.

5. The metal 3D printer of claim 4, wherein the heating unit comprises:
a heating part that is insertable to the hollow and configured to heat the material seated on the connector member through the hollow;
a first heating driving part coupled with the heating part to allow the heating part to move in the third direction; and
a second heating driving part coupled with the first heating driving part to allow the first heating driving part to rotate around the third direction.

* * * * *